(12) United States Patent
Pan et al.

(10) Patent No.: US 10,571,792 B2
(45) Date of Patent: *Feb. 25, 2020

(54) PROJECTION DEVICE AND PROJECTION SYSTEM

(71) Applicant: Coretronic Corporation, Hsin-Chu (TW)

(72) Inventors: Haw-Woei Pan, Hsin-Chu (TW);
Chih-Hsien Tsai, Hsin-Shu (TW);
Yi-Hsuang Weng, Hsin-Chu (TW);
Chi-Tang Hsieh, Hsin-Chu (TW);
Jo-Han Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,211

(22) Filed: Sep. 17, 2018

(65) Prior Publication Data

US 2019/0086784 A1   Mar. 21, 2019

(30) Foreign Application Priority Data

Sep. 20, 2017 (CN) .......................... 2017 1 0853678

(51) Int. Cl.
*G03B 21/60* (2014.01)
*G02B 27/09* (2006.01)
(Continued)

(52) U.S. Cl.
CPC ......... *G03B 21/60* (2013.01); *G02B 27/0955* (2013.01); *G03B 21/142* (2013.01);
(Continued)

(58) Field of Classification Search
CPC ........ G03B 21/56; G03B 21/60; G03B 21/58; G03B 21/625; G03B 21/62
(Continued)

(56) References Cited

U.S. PATENT DOCUMENTS

| 7,537,346 B2 * | 5/2009 | Liu | ........................ | G03B 21/56 353/31 |
| 7,914,154 B2 * | 3/2011 | Obi | ........................ | G03B 21/56 353/79 |

(Continued)

FOREIGN PATENT DOCUMENTS

| CN | 204009344 U | 12/2014 |
| CN | 204719339 U | 10/2015 |

*Primary Examiner* — Clayton E. LaBalle
*Assistant Examiner* — Kevin C Butler

(57) ABSTRACT

A projection device for forming an image frame on a projection screen includes a first illumination system for emitting an illumination beam, a second illumination system for emitting an ultraviolet beam, a first light valve located on a transmission path of the illumination beam and for converting the illumination beam into a visible image beam, a lens located on a transmission path of the visible image beam and the ultraviolet beam and for projecting the visible image beam onto the projection screen to form an image frame area and projecting the ultraviolet beam onto the projection screen to form an opaque area, and a processor electrically connected to the first illumination system and the second illumination system and for controlling the first illumination system to emit the illumination beam and controlling the second illumination system to emit the ultraviolet beam. The image frame area partially overlaps the opaque area.

26 Claims, 9 Drawing Sheets

(51) Int. Cl.
*G03B 21/14* (2006.01)
*G03B 21/62* (2014.01)
*G03B 21/56* (2006.01)
*G03B 21/58* (2014.01)
*G03B 21/625* (2014.01)
*G03B 21/10* (2006.01)

(52) U.S. Cl.
CPC ............ *G03B 21/56* (2013.01); *G03B 21/58* (2013.01); *G03B 21/62* (2013.01); *G03B 21/625* (2013.01); *G03B 21/10* (2013.01)

(58) Field of Classification Search
USPC ........................................................ 359/443
See application file for complete search history.

(56) References Cited

U.S. PATENT DOCUMENTS

| | | | |
|---|---|---|---|
| 9,019,584 B2* | 4/2015 | Yamaichi | C23C 14/06 |
| | | | 359/9 |
| 9,445,065 B1* | 9/2016 | Reichow | H04N 9/3179 |
| 9,774,832 B1* | 9/2017 | Minami | H04N 9/3185 |
| 9,807,356 B1* | 10/2017 | Minami | H04N 9/3155 |
| 2005/0094109 A1* | 5/2005 | Sun | G03B 21/60 |
| | | | 353/79 |
| 2006/0290905 A1* | 12/2006 | May | H04N 5/7458 |
| | | | 353/122 |
| 2008/0317977 A1* | 12/2008 | Wu | C09K 19/544 |
| | | | 428/1.21 |
| 2017/0060280 A1* | 3/2017 | Hsu | G06F 3/041 |
| 2019/0886785 | 3/2019 | Pan et al. | |

* cited by examiner

PROJECTION DEVICE AND PROJECTION SYSTEM

CROSS-REFERENCE TO RELATED APPLICATION

THIS APPLICATION CLAIMS THE PRIORITY BENEFIT OF CHINA APPLICATION (CN201710853678.8 FILED ON 2017 Sep. 20). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a projection device, and more particularly to a projection device for a projection system.

BACKGROUND OF THE INVENTION

In order for various demands such as lighting, fashion, exhibition, security and so on, a large number of glass doors and windows are used in modern architecture. The projection display applications will be significantly expanded if these glass doors and windows can be used as a projection screen.

However, because the glass doors and windows are light-transmitting material, the projection device is not easy to display a clear image frame on the glass doors and windows. Therefore, at present, the common solution for projecting on a light-transmitting material is to provide a diffusion film or a hologram film on a light-transmitting material. In addition, the aforementioned problem can also be solved by the transparent liquid crystal display architecture or liquid crystal dimming glass architecture.

However, there are different defects in the solutions of using the above-mentioned light-transmitting material in the field of projection. For example, the diffusion film may destroy the original characteristics of light-transmitting material and may shield the rear environmental image and field of view; the hologram film has the effect only in a specific angle of view; the transparent liquid crystal display architecture has low light transmission problems; and the liquid crystal dimming glass architecture has expensive problems.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One objective of the invention is to provide a projection device for projecting an image frame having a high clarity and contrast on a projection screen.

Another objective of the invention is to provide a projection system for projecting an image frame having a high clarity and contrast on a projection screen.

Other objectives and advantages of the invention will become apparent from the technical features disclosed herein.

In order to achieve one of or some of or all of the above objectives or other objectives, the invention provides a projection device for forming an image frame on a projection screen. The projection device includes a first illumination system, a second illumination system, a first light valve, a lens and a processor. The first illumination system is for emitting an illumination beam. The second illumination system is for emitting an ultraviolet beam. The first light valve is located on a transmission path of the illumination beam and for converting the illumination beam into a visible image beam. The lens is located on a transmission path of the visible image beam and the ultraviolet beam. The lens is for projecting the visible image beam onto the projection screen to form an image frame area and projecting the ultraviolet beam onto the projection screen to form an opaque area. The image frame area is partially overlapped with the opaque area. The processor is electrically connected to the first illumination system and the second illumination system. The processor is for controlling the first illumination system to emit the illumination beam and controlling the second illumination system to emit the ultraviolet beam.

In order to achieve one of or some of or all of the above objectives or other objectives, the invention provides a projection device for forming an image frame on a projection screen. The projection device includes a first projector, a second projector, a first processor and a second processor. The first projector is for emitting a visible image beam to the projection screen to form an image frame area on the projection screen. The second projector is for emitting an ultraviolet beam to the projection screen to form an opaque area on the projection screen. The image frame area is partially overlapped with the opaque area. The first processor is disposed in the first projector and for controlling the first projector to emit the visible image beam. The second processor is disposed in the second projector and electrically connected to the first processor. The second processor is for controlling the second projector to emit the ultraviolet beam and issuing a control signal to the first processor, so that the first processor controls the first projector to emit the visible image beam.

In order to achieve one of or some of or all of the above objectives or other objectives, the invention provides a projection system, which includes a projection screen and a projection device. The projection device includes a first illumination system, a second illumination system, a first light valve, a lens and a processor. The first illumination system is for emitting an illumination beam. The second illumination system is for emitting an ultraviolet beam. The first light valve is located on a transmission path of the illumination beam and for converting the illumination beam into a visible image beam. The lens is located on a transmission path of the visible image beam and the ultraviolet beam. The lens is for projecting the visible image beam onto the projection screen to form an image frame area and for projecting the ultraviolet beam onto the projection screen to form an opaque area. The image frame area is partially overlapped with the opaque area. The processor is electrically connected to the first illumination system and the second illumination system. The processor is for controlling the first illumination system to emit the illumination beam and controlling the second illumination system to emit the ultraviolet beam.

In order to achieve one of or some of or all of the above objectives or other objectives, the invention provides a projection system, which includes a projection screen and a projection device. The projection device includes a first projector, a second projector, a first processor and a second processor. The first projector is for emitting a visible image beam to the projection screen to form an image frame area on the projection screen. The second projector is for emitting an ultraviolet beam to the projection screen to form an opaque area on the projection screen. The image frame area is partially overlapped with the opaque area. The first processor is disposed in the first projector and for controlling the first projector to emit the visible image beam. The second processor is disposed in the second projector and electrically connected to the first processor. The second processor is for controlling the second projector to emit the ultraviolet beam and issuing a control signal to the first processor, so that the first processor controls the first projector to emit the visible image beam.

The projection system of the embodiment includes a projection device capable of emitting a visible image beam and an ultraviolet beam and a projection screen capable of being changed from a transparent state to an opaque state. When the projection device simultaneously emits the visible image beam and the ultraviolet beam onto the projection screen, the ultraviolet absorption layer of the projection screen receives the ultraviolet beam and is changed from the transparent state to the opaque state. At this time, the visible image beam emitted by the projection device can be projected on a black opaque area on the projection screen to display a clear and high contrast image frame.

Other objectives, features and advantages of the invention will be further understood from the further technological features disclosed by the embodiments of the invention wherein there are shown and described preferred embodiments of the invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
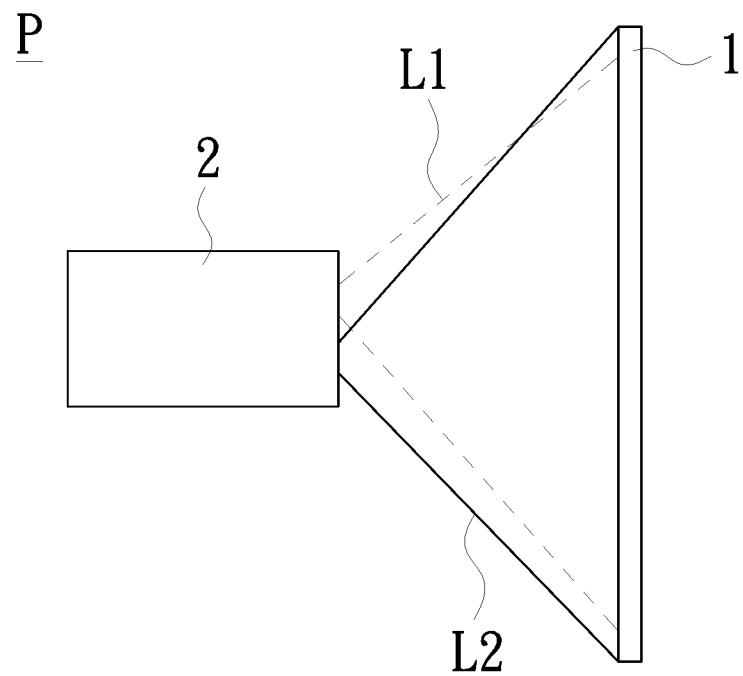
FIG. 1 is a schematic view of a projection system in accordance with an embodiment of the invention.
Figure 2:
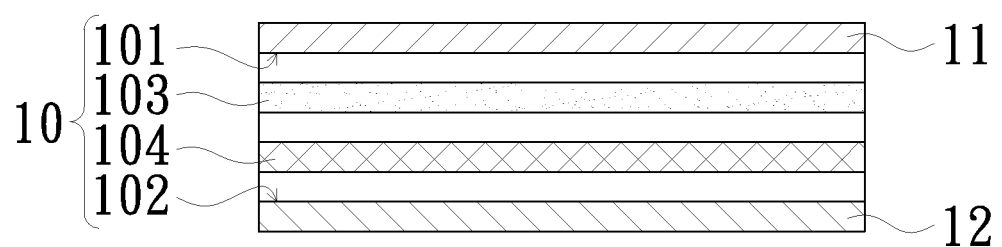
FIG. 2 is a schematic cross-sectional view of a projection screen shown in FIG. 1.

FIG. 1 is a schematic view of a projection system in accordance with an embodiment of the invention. FIG. 2 is a schematic cross-sectional view of a projection screen shown in FIG. 1. As shown in FIG. 1, the projection system P of the embodiment is, for example, a front-projection projection system. The projection screen 1 is for receiving the visible image beam L1 and the ultraviolet beam L2 provided by the projection device 2. The projection screen 1 is changed from a transparent state to an opaque state when receiving the ultraviolet beam L2 emitted from the projection device 2, and accordingly the visible image beam L1 emitted from the projection device 2 can present a clear image frame on the projection screen 1 in an opaque state. In the embodiment, the wavelength range of the ultraviolet beam L2 provided by the projection device 2 is between 100 nm and 400 nm. In addition, it is to be noted that the detailed structure of the projection screen 1 and the projection device 2 will be described below.

As shown in FIG. 2, the projection screen 1 of the embodiment includes a substrate 10, an anti-reflection layer 11 and an anti-ultraviolet layer 12. In the embodiment, the material of the substrate 10 is, for example, glass or plastic or a mixture thereof, but the invention is not limited thereto. The substrate 10 is light-transmissive when not receiving the ultraviolet beam L2. The substrate 10 includes a first surface 101 adjacent to the projection device 2, a second surface 102 away from the projection device 2 and opposite to the first surface 101, a scattering reflection layer 103 and an ultraviolet absorption layer 104. The scattering reflection layer 103 of the substrate 10 is disposed between the first surface 101 and the second surface 102. In the embodiment, the scattering reflection layer 103 is used for scattering and reflecting the visible image beam L1 provided by the projection device 2. The ultraviolet absorption layer 104 of the substrate 10 is disposed between the first surface 101 and the second surface 102, and the scattering reflection layer 103 is located between the first surface 101 and the ultraviolet absorption layer 104. In the embodiment, the ultraviolet beam L2 provided by the projection device 2 penetrates the first surface 101, passes through the scattering reflection layer 103 and then is transmitted to the ultraviolet absorption layer 104. Accordingly, the ultraviolet absorption layer 104 is changed from a transparent state to an opaque state when absorbing the ultraviolet beam L2 provided by the projection device 2. The anti-reflection layer 11 is disposed on the first surface 101 of the substrate 10. In the embodiment, the anti-reflection layer 11 is capable of reducing the reflectance of the visible image beam L1 on the first surface 101 of the substrate 10 so as to increase the transmittance of the visible image beam L1 to the first surface 101 of the substrate 10. The anti-ultraviolet layer 12 is disposed at the second surface 102, and the ultraviolet absorption layer 104 is located between the scattering reflection layer 103 and the anti-ultraviolet layer 12. In the embodiment, the anti-ultraviolet layer 12 is capable of isolating the ultraviolet light in the environment to prevent the ultraviolet light in the environment from passing through the second surface 102 of the substrate 10 to the inside of the substrate 10 and being absorbed by the ultraviolet absorption layer 104 thereby causing the projection screen 1 to be non-light-transmissive.

The other details of the projection screen 1 of the embodiment and other embodiments will be described in further detail below.

Figure 3:
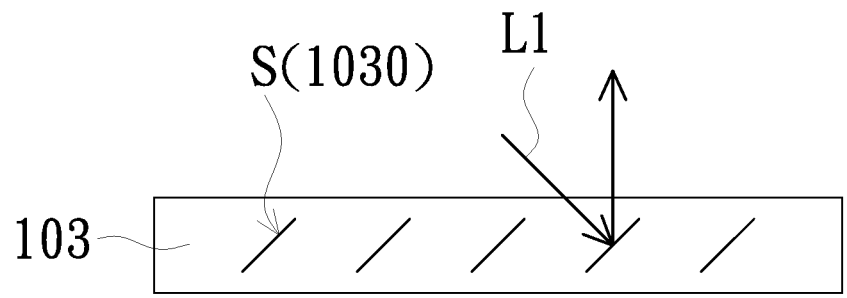
FIG. 3 is a schematic structural view of a scattering reflection layer shown in FIG. 2.

FIG. 3 is a schematic structural view of the scattering reflection layer 103 shown in FIG. 2. As shown in FIG. 3 and also refer to FIGS. 1 and 2, the scattering reflection layer 103 of the embodiment includes, for example, a plurality of microstructures 1030. Each microstructure 1030 has an inclined surface S facing the projection device 2. The inclination angle of the inclined surface S may be different, and the inclination angle of the inclined surface S may be adjusted according to the position where the projection device 2 is placed. Each microstructure 1030 scatters and reflects the visible image beam L1 from the projection device 2 by the inclined surface S so as to enhance the clarity and the viewing angle of the image frame formed by the visible image beam L1 on the projection screen 2. In the embodiment, each microstructure 1030 of the scattering reflection layer 103 is, for example, a film layer made of a metal material and having a thickness which allows the transmission of light, and the light transmittance of each microstructure 1030 is 75% for example, but the invention is not limited thereto.

It is to be noted that the wavelength range of the ultraviolet beam L2 provided by the projection device 2 and absorbed by the ultraviolet absorption layer 104 is, for example, between 100 nm and 400 nm. The ultraviolet absorption layer 104 is changed from a transparent state to an opaque state when absorbing the ultraviolet beam L2 having a wavelength in the range from 100 nm to 400 nm, wherein the opaque state is, for example, a state in which the ultraviolet absorption layer 104 exhibits a dark black color. The contrast of the image frame formed by the visible image beam L1 of the projection device 2 on the projection screen 1 is enhanced when the ultraviolet absorption layer 104 exhibits a dark black state. In addition, since the ultraviolet absorption layer 104 exhibits a dark black state, the observer can view the image frame only from one side of the projection screen 1 facing the projection device 2 (i.e., the first surface 101 of the substrate 10) and will not view the image frame from the side of the projection screen 1 away from the projection device 2 (i.e., the second surface 102 of the substrate 10). Similarly, the visible image beam L1 of the projection device 2 does not pass through the ultraviolet absorption layer 104 of the projection screen 2 to irradiate the observer when the observer is positioned on the side of the projection screen 1 away from the projection device 2. In addition, the ultraviolet absorption layer 104 is made of, for example, a silver halide (usually silver chloride) having a microcrystalline structure or an organic light color molecule (e.g., oxazines or naphthopyrans). Such substances are transparent to visible light when not being irradiated by the ultraviolet light. Such substances will have a chemical reaction when being irradiated by the ultraviolet light and become capable of absorbing visible beam, so that the observer will view a black area.

Figure 4:
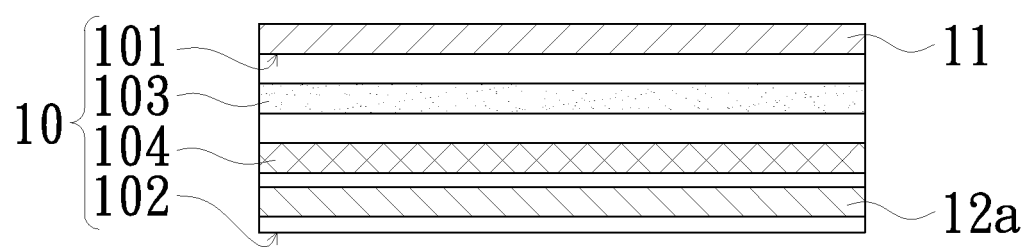
FIG. 4 is a schematic cross-sectional view of a projection screen in accordance with another embodiment of the invention.

FIG. 4 is a schematic cross-sectional view of a projection screen in accordance with another embodiment of the invention. The projection screen 1a of the embodiment is similar to the projection screen 1 shown in FIG. 2, and the difference is that the anti-ultraviolet layer 12a of the projection screen 1a of the embodiment is disposed in the substrate 10. Specifically, the anti-ultraviolet layer 12a of the embodiment is located between the second surface 102 and the ultraviolet absorption layer 104 of the substrate 10. In such a structural design, the anti-ultraviolet layer 12a is also capable of isolating the ultraviolet light in the environment to prevent ultraviolet light in the environment from passing through the second surface 102 of the substrate 10 to the inside of the substrate 10. And since the anti-ultraviolet layer 12a is located in the substrate 10, the thickness of the projection screen 1a is effectively reduced. In addition, it is to be noted that in the embodiment, the anti-ultraviolet layer 12a is still disposed at the second surface 102 of the substrate 10 although the anti-ultraviolet layer 12a is located in the substrate 10.

The detailed structure of the projection device 2 of the embodiment and the various different embodiments will be described below.

Figure 5:
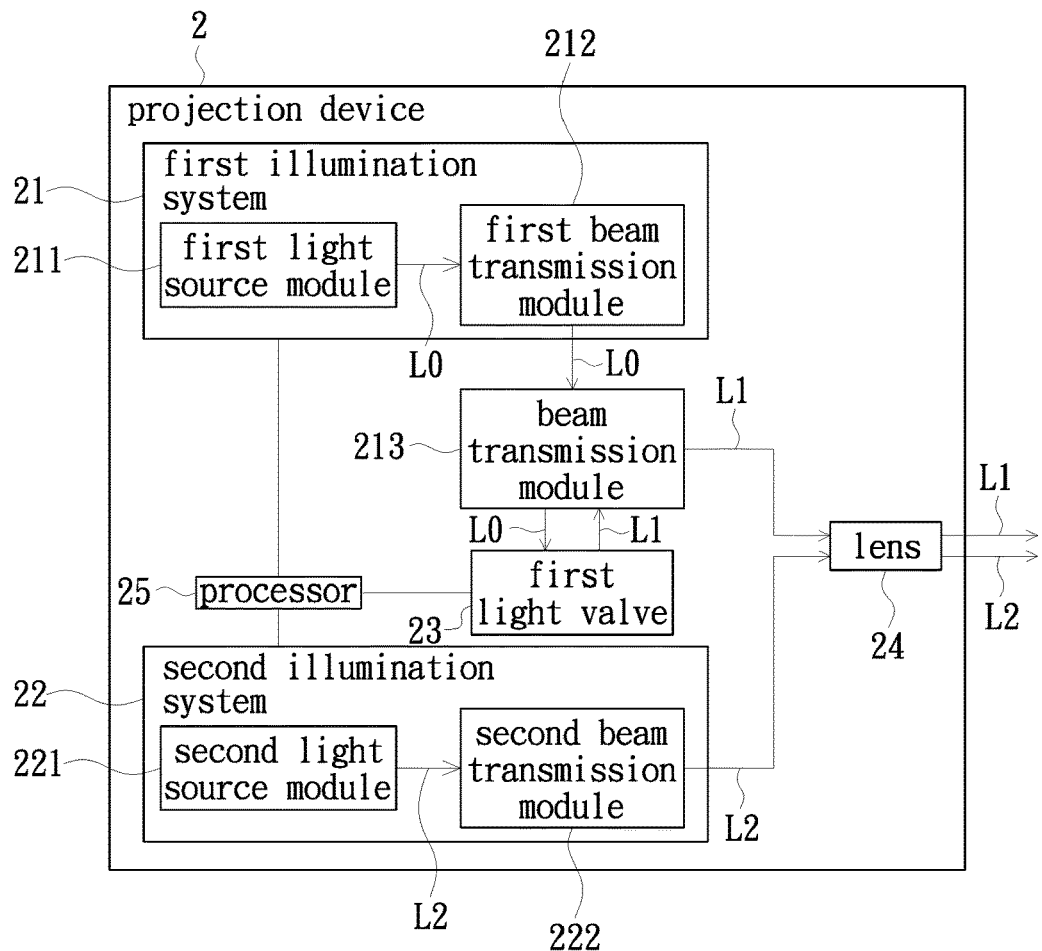
FIG. 5 is a schematic functional block diagram of a projection device shown in FIG. 1.
Figure 6:
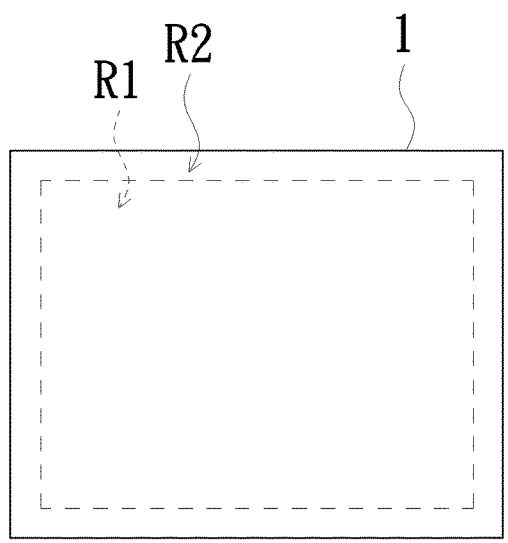
FIG. 6 is a schematic view of an image frame area formed by a projection device shown in FIG. 5 on a projection screen.

FIG. 5 is a schematic functional block diagram of the projection device 2 shown in FIG. 1. FIG. 6 is a schematic view of an image frame area formed by the projection device 2 shown in FIG. 5 on the projection screen 1. As shown in FIGS. 5 and 6, the projection device 2 of the embodiment includes a first illumination system 21, a second illumination system 22, a first light valve 23, a lens 24 and a processor 25. The first illumination system 21 is used for emitting an illumination beam L0. The second illumination system 22 is adapted to emit an ultraviolet beam L2. The first light valve 23 is located on the transmission path of the illumination beam L0. The first light valve 23 is used for converting the illumination beam L0 into a visible image beam L1. The lens 24 is located on the transmission path of the visible image beam L1 and the ultraviolet beam L2. The lens 24 is used for projecting the visible image beam L1 onto the projection screen 1 to form an image frame area R1 and projecting the ultraviolet beam L2 onto the projection screen 1 to form an opaque area R2. In the embodiment, the image frame area R1 and the opaque area R2 are located at the same position on the projection screen 1, overlapped with each other and have the same area size. In addition, in the embodiment, the opaque area R2 covers the entire display surface of the projection screen 1. The processor 25 is electrically connected to the first illumination system 21 and the second illumination system 22. The processor 25 is used for controlling the first illumination system 21 to emit the illumination beam L0 and controlling the second illumination system 22 to emit the ultraviolet beam L2.

In addition, as shown in FIG. 5, the processor 25 of the embodiment is also electrically connected to the first light valve 23. The processor 25 is used for controlling the first light valve 23 to convert the illumination beam L0 into the visible image beam L1, but the invention is not limited thereto. Before the visible image beam L1 is projected onto the projection screen 1 to form the image frame area R1, the ultraviolet beam L2 emitted from the second illumination system 22 has been irradiated onto the projection screen 1 to form the opaque area R2.

In addition, in the embodiment, the first light valve 23 is, for example, a digital micromirror device (DMD), a liquid crystal on silicon (LCoS) or a liquid crystal display panel (LCD), but the invention is not limited thereto. The processor 23 is, for example, a central processing unit (CPU), a microprocessor with other programmable general purpose or special purpose, a digital signal processor (DSP), a programmable controller, an application specific integrated circuits (ASIC), a programmable logic device (PLD), or the like or a combination of these devices.

As shown in FIG. 5, the first illumination system 21 of the embodiment includes a first light source module 211 and a first beam transmission module 212. The first beam transmission module 212 is located on the transmission path of the illumination beam L0 and between the first light source module 211 and the first light valve 23. The first light source module 211 is used for emitting the illumination beam L0 to the first beam transmission module 212. The first beam transmission module 212 is used for transmitting the illumination beam L0 to the first light valve 23. The second illumination system 22 of the embodiment includes a second light source module 221 and a second beam transmission module 222. The second beam transmission module 222 is located on the transmission path of the ultraviolet beam L2 and between the second light source module 221 and the lens 24. The second light source module 221 is used for emitting the ultraviolet beam L2 to the second beam transmission module 222. The second beam transmission module 222 is used for transmitting the ultraviolet beam L2 to the lens 24.

As shown in FIG. 5, the first illumination system 21 of the embodiment further includes a beam transmission module 213. The beam transmission module 213 is located on the transmission path of the illumination beam L0 emitted from the first light source module 211 and on the transmission path of the visible image beam L1, and the beam transmission module 213 is located among the first beam transmission module 212, the first light valve 23 and the lens 24. The illumination beam L0 transmitted via the first beam transmission module 212 is transmitted to the first light valve 23 through the transmission module 213. The first light valve 23 converts the illumination beam L0 into the visible image beam L1, and then the visible image beam L1 is transmitted to the lens 24 through the transmission module 213.

In the embodiment, the first light source module 211 is, for example, a plurality of laser diodes or light emitting diodes (LEDs) arranged in an array, but the invention is not limited thereto. The second light source module 221 is, for example, an ultraviolet emitting diode, but the invention is not limited thereto. The first beam transmission module 212 is, for example, a combination of a lens group, a phosphor wheel, a light combining element and a light collecting element. The second beam transmission module 222 is, for example, a combination of a lens group, a light combining element and a light collecting element. The beam transmission module 213 is, for example, a combination of a dichroic prism, a mirror, etc. However, the invention does not limit the structure of the first beam transmission module 212, the second beam transmission module 222 and the beam transmission module 213.

According to the above description, it is understood that the structure of the projection device 2 of the embodiment can also emit the visible image beam L1 and the ultraviolet beam L2 to the projection screen 1 at the same time point, so that the visible image beam L1 and the ultraviolet beam L2 are located at the same position on the projection screen 1 and are overlapped with each other. When the ultraviolet absorption layer 104 of the projection screen 1 (as shown in FIG. 2) receives the ultraviolet beam L2 emitted from the projection device 2, the ultraviolet absorption layer 104 is changed from a transparent state to an opaque state so as to form an opaque area R2 on the projection screen 1. Meanwhile, the visible image beam L1 emitted from the projection device 2 can be projected onto the opaque area R2 exhibiting a black color to form a clear image frame on the image frame area R1.

Figure 7:
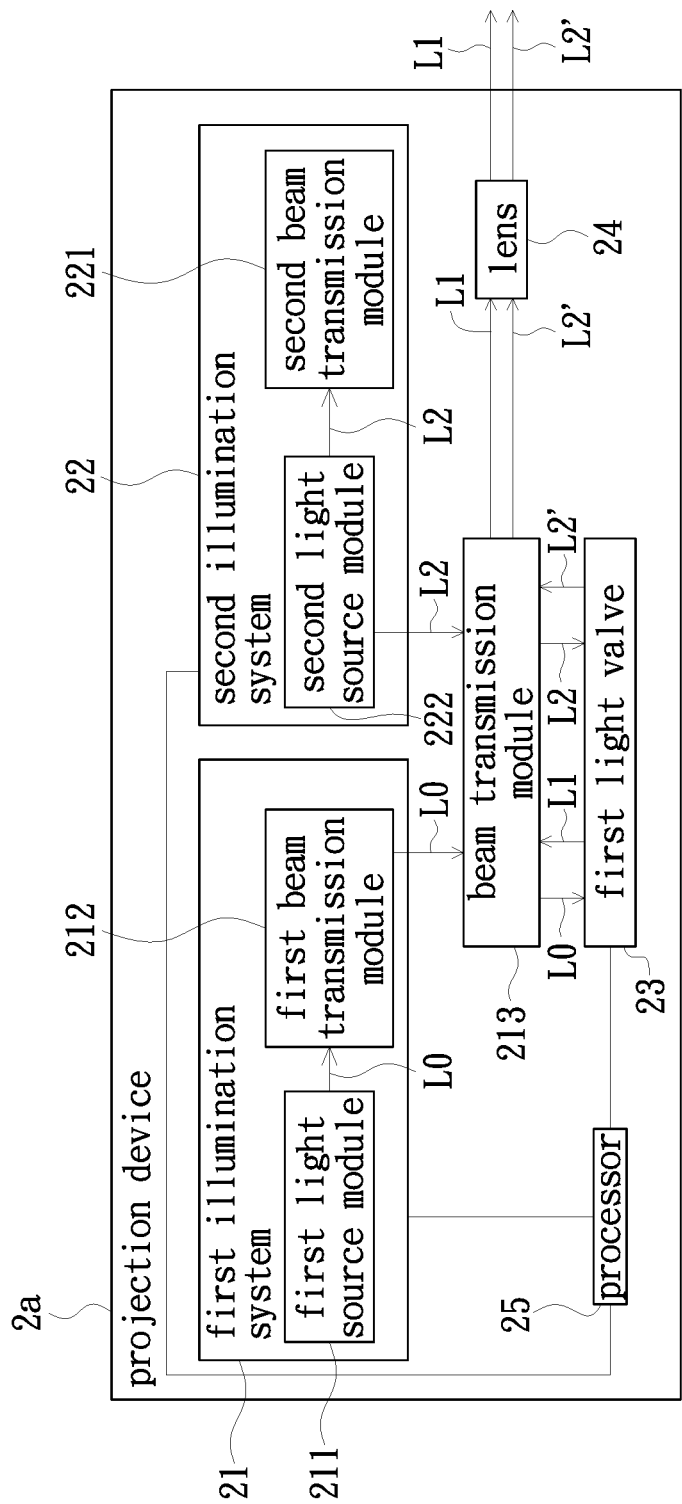
FIG. 7 is a schematic functional block diagram of a projection device in accordance with another embodiment of the invention.
Figure 8:
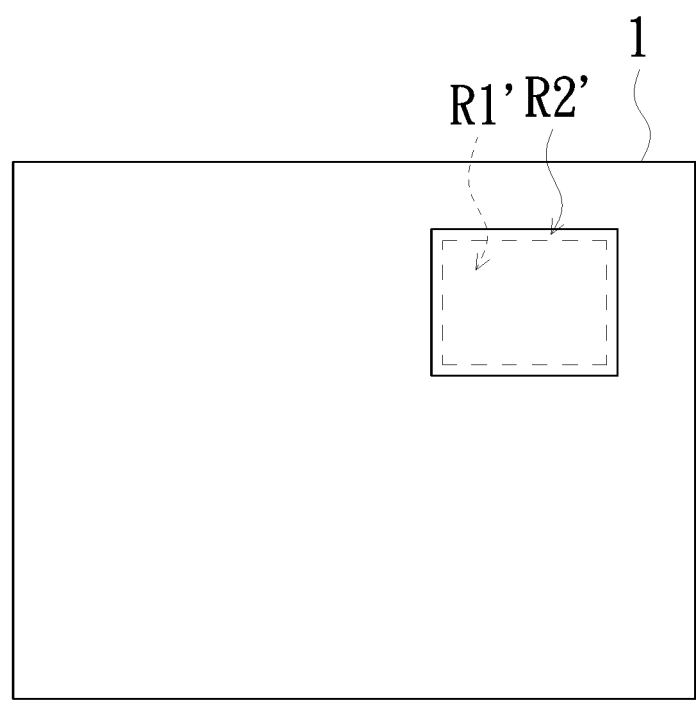
FIG. 8 is a schematic view of an image frame area formed by a projection device shown in FIG. 7 on a projection screen.

FIG. 7 is a schematic functional block diagram of a projection device in accordance with another embodiment of the invention. FIG. 8 is a schematic view of an image frame area formed by the projection device 2a shown in FIG. 7 on the projection screen 1. As shown in FIGS. 7 and 8, the projection device 2a of the embodiment is similar to the projection device 2 shown in FIG. 5, and the difference is that the first light valve 23 of the projection device 2a of the embodiment is located on the transmission path of the ultraviolet beam L2 emitted from the second light source module 221. In the embodiment, the second beam transmission module 222 is located on the transmission path of the ultraviolet beam L2 and between the second light source module 221 and the first light valve 23. The second beam transmission module 222 is used for transmitting the ultraviolet beam L2 to the beam transmission module 213. The light beam transmission module 213 transmits the ultraviolet light beam L2 to the first light valve 23. The first light valve 23 is used for converting the ultraviolet beam L2 into an ultraviolet beam L2' including image information. The ultraviolet beam L2' including image information is then transmitted to the lens 24 through the beam transmission module 213. The lens 24 projects the ultraviolet beam L2' including image information onto the projection screen 1 to form an opaque area R2' on the part of the projection screen 1. Meanwhile, the lens 24 projects the visible image beam L1 including image information onto the projection screen 1 to form an image frame area R1' on the opaque area R2'. It is to be noted that the image information included in the ultraviolet beam L2' includes frame data constituting the opaque area R2', and the image information included in the visible image beam L1 includes frame data constituting the image frame area R1'. In addition, in the embodiment, the frame data included in the visible image beam L1 and for constituting the image frame area R1' and the frame data included in the ultraviolet beam L2' including image information and for constituting the opaque area R2' are the same. For example, the frame data can be the size, shape or text of a frame, but the invention is not limited thereto. The architecture of the projection device 2a of the embodiment can also realize the effect of projecting a clear image frame on the projection screen 1.

Figure 9A:
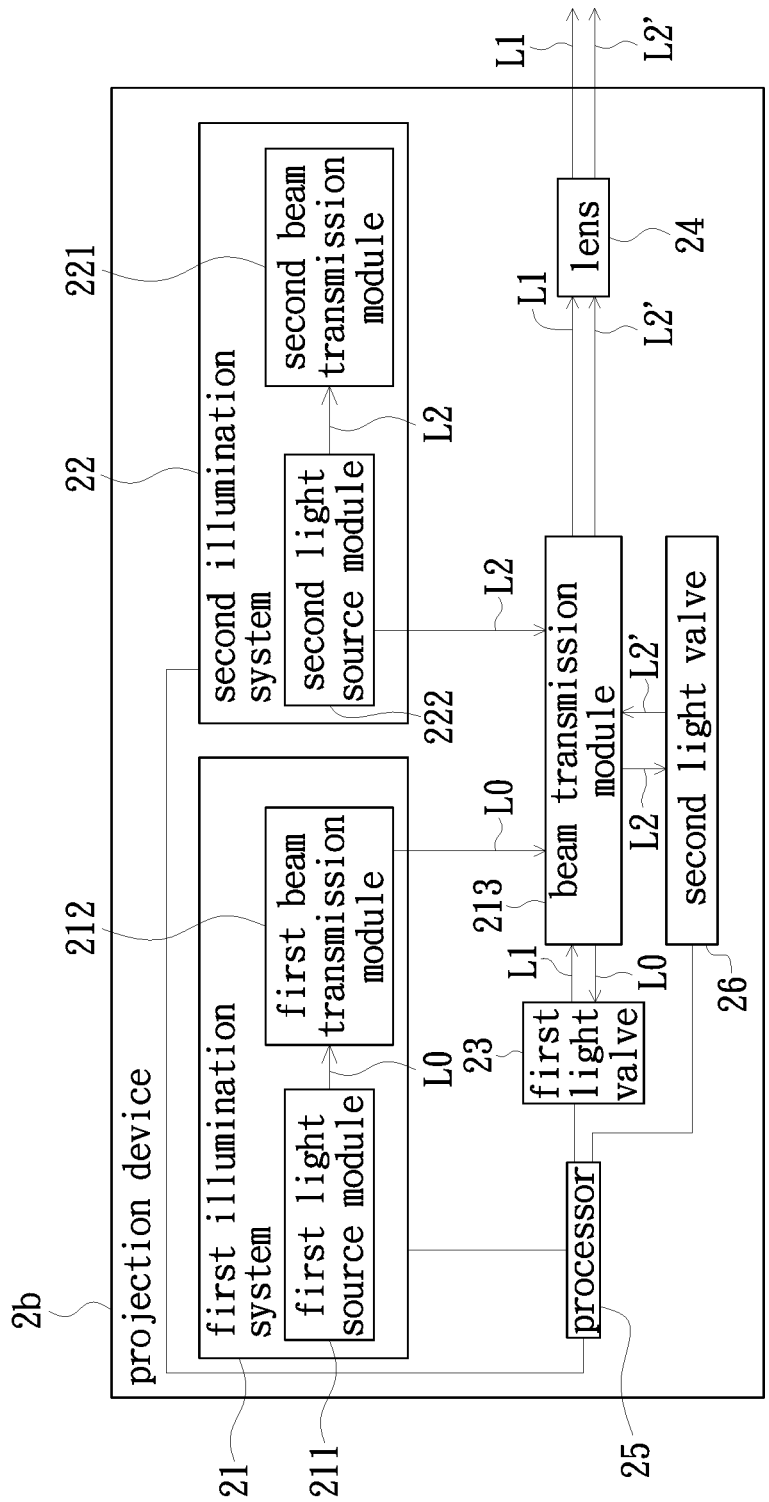
FIG. 9A is a schematic functional block diagram of a projection device in accordance with another embodiment of the invention.
Figure 9B:
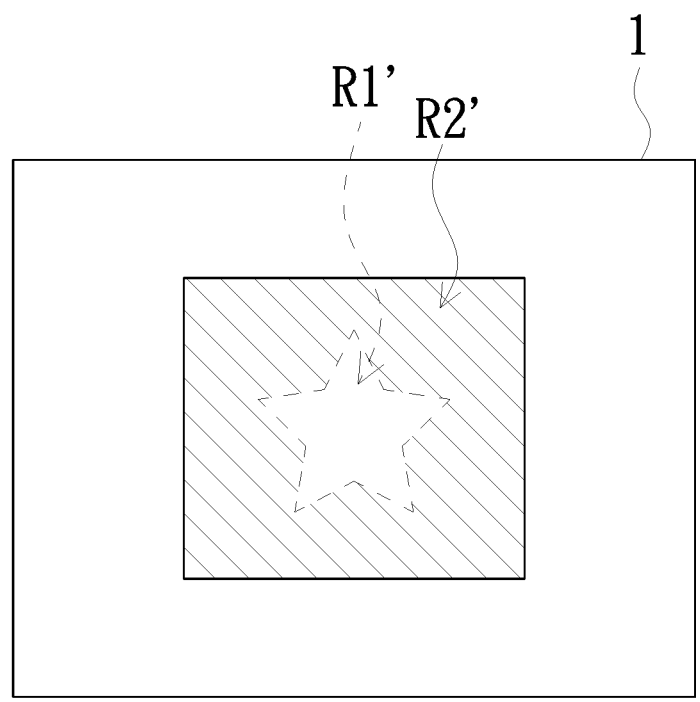
FIG. 9B is a schematic view of an image frame area formed by a projection device shown in FIG. 9A on a projection screen.

FIG. 9A is a schematic functional block diagram of a projection device in accordance with another embodiment of the invention. FIG. 9B is a schematic view of an image frame area formed by the projection device 2b shown in FIG. 9A on the projection screen 1. As shown in FIG. 9A, the projection device 2b of the embodiment is similar to the projection device 2a shown in FIG. 7, and the difference is that the projection device 2b of the embodiment further includes a second light valve 26. In the embodiment, the second light valve 26 is located on the transmission path of the ultraviolet beam L2 emitted from the second light source module 221. In the embodiment, the second light valve 26 is located on the transmission path of the ultraviolet beam L2' including image information and between the beam transmission module 213 and the lens 24. The second beam transmission module 222 is used for transmitting the ultraviolet beam L2 to the beam transmission module 213. The light beam transmission module 213 transmits the ultraviolet light beam L2 to the second light valve 26. The second light valve 26 is used for converting the ultraviolet beam L2 into the ultraviolet beam L2' including image information. The ultraviolet beam L2' including image information is then transmitted to the lens 24 through the beam transmission module 213. The lens 24 projects the ultraviolet beam L2' including image information onto the projection screen 1 to form an opaque area R2' on the part of the projection screen 1. Meanwhile, the lens 24 projects the visible image beam L1 onto the projection screen 1 to form an image frame area R1' on the opaque area R2'. In the embodiment, it is to be noted that the frame data included in the visible image beam L1 and for constituting the image frame area R1' and the frame data included in the ultraviolet beam L2' including image information and for constituting the opaque area R2' are different, and the area of the opaque area R2' constituted by the ultraviolet beam L2' including image information is larger than the area of the image frame area R1' constituted by the visible image beam L1. For example, in the schematic view of an image frame area formed on the projection screen 1 as shown in FIG. 9B, the hatched area represents the opaque area R2' constituted by the ultraviolet beam L2' including image information, and the star picture represents the image frame area R1' constituted by the visible image beam L1. A part of the opaque area R2' overlaps the star picture so that the opaque area R2' is partially overlapped with the image frame area R1'. The architecture of the projection device 2b of the embodiment can also realize the effect of projecting a clear and high contrast image frame on the projection screen 1.

As shown in FIG. 9A, the processor 25 of the embodiment is electrically connected to the first illumination system 21 and the second illumination system 22. The processor 25 is used for controlling the first illumination system 21 to emit an illumination beam L0 and simultaneously controlling the second illumination system 22 to emit an ultraviolet beam L2. In the embodiment, the processor 25 is also electrically connected to the first light valve 23 and the second light valve 26. The processor 25 is further used for controlling the first light valve 23 to convert the illumination beam L0 into the visible image beam L1 and controlling the second light valve 26 to convert the ultraviolet beam L2 into the ultraviolet beam L2' including image information, wherein the image frame area R1' and the opaque area R2' may have the same/different display of pattern or text.

Figure 10:
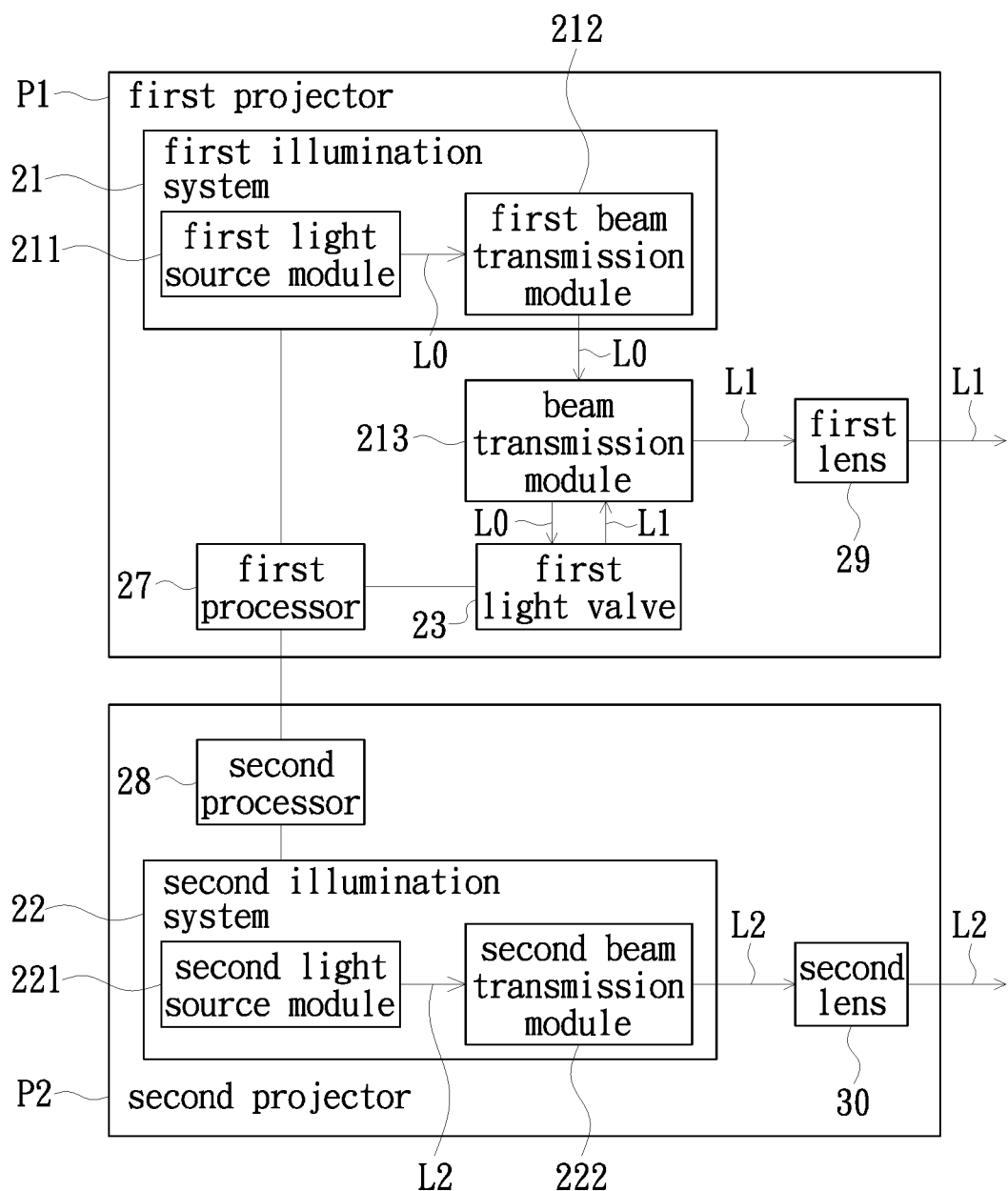
FIG. 10 is a schematic functional block diagram of a projection device in accordance with another embodiment of the invention.

FIG. 10 is a schematic functional block diagram of a projection device in accordance with another embodiment of the invention. As shown in FIG. 10 and also refer to FIGS. 1 and 6, the projection device 2c of the embodiment is similar to the projection device 2 shown in FIG. 5, and the difference is that the projection device 2c of the embodiment includes a first projector P1, a second projector P2, a first processor 27 and a second processor 28. In the embodiment, the first projector P1 and the second projector P2 are two independent devices, and the first projector P1 and the second projector P2 are detachably connected to each other, but the invention is not limited thereto. The assembling means or the arrangement position between the first projector P1 and the second projector P2 may be different depending on the actual requirement. The first projector P1 is used for emitting the visible image beam L1 to the projection screen 1 so as to form an image frame area R1 on the projection screen 1. The second projector P2 is used for emitting the ultraviolet beam L2 to the projection screen 1 so as to form an opaque area R2 on the projection screen 1. In the embodiment, the image frame area R1 and the opaque area R2 are located at the same position on the projection screen 1 and are overlapped with each other. The first processor 27 is disposed in the first projector P1. The first processor 27 is used for controlling the first projector P1 to emit the visible image beam L1. The second processor 28 is disposed in the second projector P2 and is electrically connected to the first processor 27. The second processor 28 is used for controlling the second projector P2 to emit the ultraviolet beam L2 and simultaneously issuing a control signal to the first processor 27, so that the first processor 27 controls the first projector P1 to emit the visible image beam L1. In another embodiment, the first processor 27 is electrically connected to the second processor 28, and the first processor 27 controls the first projector P1 to emit the visible image beam L1 and simultaneously issuing a control signal to the second processor 28, so that the second processor 28 controls the second projector P2 to emit the ultraviolet beam L2. It is to be noted that schematic view of the opaque area and the image frame area formed by the projection device 2c of the embodiment on the projection screen is similar to that shown in FIG. 6, and no redundant drawing is to be given herein.

As shown in FIG. 10, the first projector P1 of the embodiment includes a first illumination system 21, a first light valve 23 and a first lens 29. The first illumination system 21 is used for emitting an illumination beam L0. The first light valve 23 is located on the transmission path of the illumination beam L0. The first light valve 23 is used for converting the illumination beam L0 into the visible image beam L1. The first lens 29 is located on the transmission path of the visible image beam L1. The first lens 29 is used for projecting the visible image beam L1 onto the projection screen 1 to form the image frame area R1. The second projector P2 includes a second illumination system 22 and a second lens 30. The second illumination system 22 is used for emitting the ultraviolet beam L2. The second lens 30 is located on the transmission path of the ultraviolet beam L2. The second lens 30 is used for projecting the ultraviolet beam L2 onto the projection screen 1 to form the opaque area R2.

As shown in FIG. 10, the first processor 27 of the embodiment is electrically connected to the first illumination system 21 and the first light valve 23. The first processor 27 is used for controlling the first illumination system 21 to emit the illumination beam L0 and controlling the first light valve 23 to convert the illumination beam L0 into the visible image beam L1. The first illumination system 21 of the embodiment includes a first light source module 211 and a first beam transmission module 212. The first beam transmission module 212 is located on the transmission path of the illumination beam L0 and between the first light source module 211 and the first light valve 23. The first light source module 211 is used for emitting the illumination beam L0 to the first beam transmission module 212. The first beam transmission module 212 is used for transmitting the illumination beam L0 to the first light valve 23. The second illumination system 22 of the embodiment includes a second light source module 221 and a second beam transmission module 222. The second beam transmission module 222 is located on the transmission path of the ultraviolet beam L2 and between the second light source module 221 and the second lens 30. The second light source module 221 is used for emitting the ultraviolet beam L2 to the second beam transmission module 222. The second beam transmission module 222 is used for transmitting the ultraviolet beam L2 to the second lens 30. The second processor 28 of the embodiment is electrically connected to the second illumination system 22. The second processor 28 is used for controlling the second illumination system 21 to emit the ultraviolet beam L2.

As shown in FIG. 10, the first illumination system 21 of the embodiment further includes a beam transmission module 213. The beam transmission module 213 is located on the transmission path of the illumination beam L0 emitted from the first light source module 211 and on the transmission path of the visible image beam L1, and the beam transmission module 213 is located among the first beam transmission module 212, the first light valve 23 and the first lens 29. The illumination beam L0 transmitted via the first beam transmission module 212 is transmitted to the first light valve 23 through the transmission module 213. The first light valve 23 converts the illumination beam L0 into the visible image beam L1, and then the visible image beam L1 is transmitted to the first lens 29 through the transmission module 213.

Figure 11:
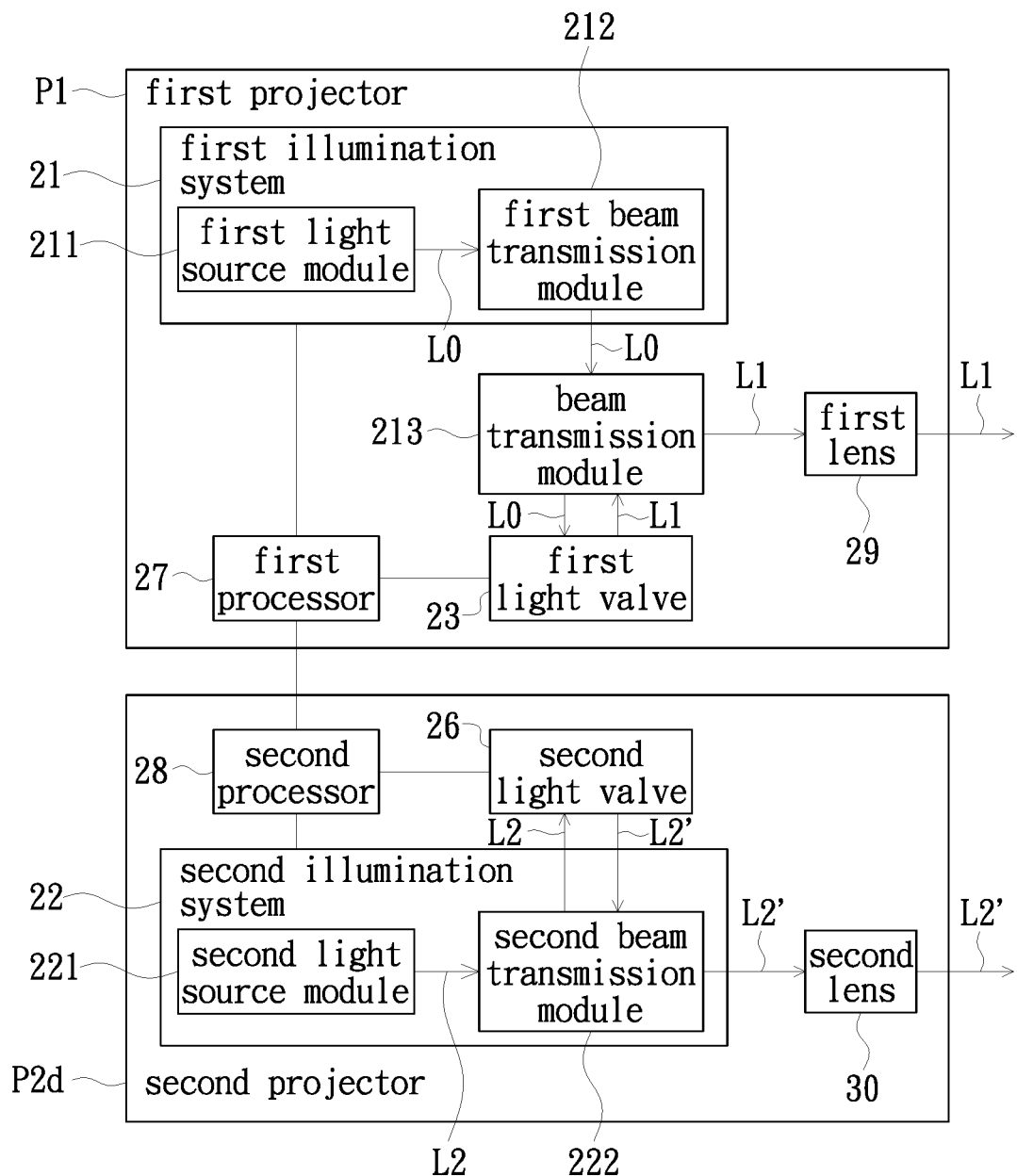
FIG. 11 is a schematic functional block diagram of a projection device in accordance with another embodiment of the invention.

FIG. 11 is a schematic functional block diagram of a projection device in accordance with another embodiment of the invention. As shown in FIG. 11 and also refer to FIGS. 1 and 8, the projection device 2d of the embodiment is similar to the projection device 2b shown in FIG. 9A and the projection device 2c shown in FIG. 10. The difference between the projection device 2d of the embodiment and the projection device 2b shown in FIG. 9A is that the projection device 2d of the embodiment includes a first projector P1 and a second projector P2d independent from each other. The difference between the projection device 2d of the embodiment and the projection device 2c shown in FIG. 10 is that the second projector P2d of the projection device 2d of the embodiment further includes a second light valve 26. In the embodiment, the second light valve 26 is located on the transmission path of the ultraviolet beam L2 emitted from the second light source module 221. Furthermore, the second light valve 26 is located on the transmission path of the ultraviolet beam L2' including image information and between the second beam transmission module 222 and the second lens 30. The second beam transmission module 222 is used for transmitting the ultraviolet beam L2 to the second light valve 26. The second light valve 26 is used for converting the ultraviolet beam L2 into an ultraviolet beam L2' including image information. The ultraviolet beam L2' including image information is then transmitted to the second lens 30 through the second beam transmission module 222. The second lens 30 projects the ultraviolet beam L2' including image information onto the projection screen so as to form an opaque area on a part of the projection screen. Meanwhile, the first lens 29 projects the visible image beam L1 onto the projection screen 1 to form the image frame area R1 on the opaque area R2. It is to be noted that schematic view of the opaque area and the image frame area formed by the projection device 2d of the embodiment on the projection screen is similar to that shown in FIG. 8 or 9A, and no redundant drawing is to be given herein. In addition, the second processor 28 of the embodiment is electrically connected to the second illumination system 22 and the second light valve 26. The second processor 28 is used for controlling the second illumination system 22 to emit the ultraviolet beam L2. The second processor 28 is further used for controlling the second light valve 26 to convert the ultraviolet beam L2 into an ultraviolet beam L2' including image information.

In summary, the projection system of the embodiment includes a projection device for emitting a visible image beam and an ultraviolet beam and a projection screen capable of being changed from a transparent state to an opaque state. When the projection device emits the visible image beam and the ultraviolet beam onto the projection screen, the ultraviolet absorption layer of the projection screen receives the ultraviolet beam and is changed from the transparent state to the opaque state. At this time, the visible image beam emitted by the projection device can be projected on a black opaque area on the projection screen to display a clear and high contrast image frame.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A projection device for forming an image frame on a projection screen, the projection device comprising:
   a first illumination system, for emitting an illumination beam;
   a second illumination system, for emitting an ultraviolet beam;
   a first light valve, located on a transmission path of the illumination beam and for converting the illumination beam into a visible image beam;
   a lens, located on a transmission path of the visible image beam and the ultraviolet beam, wherein the lens is for projecting the visible image beam onto the projection screen to form an image frame area and projecting the ultraviolet beam onto the projection screen to form a black area, and the image frame area is partially overlapped with the black area; and
   a processor, electrically connected to the first illumination system and the second illumination system, wherein the processor is for controlling the first illumination system to emit the illumination beam and controlling the second illumination system to emit the ultraviolet beam.

2. The projection device according to claim 1, wherein the first light valve is located on a transmission path of the ultraviolet beam, the first light valve is for causing the ultraviolet beam to comprise image information, and the lens is for projecting the ultraviolet beam comprising the image information onto the projection screen to form the black area on a part of the projection screen.

3. The projection device according to claim 1, wherein the processor is further electrically connected to the first light valve, and the processor is for controlling the first light valve to convert the illumination beam into the visible image beam.

4. The projection device according to claim 1, wherein the first illumination system comprises a first light source module and a first beam transmission module, the first beam transmission module is located between the first light source module and the first light valve, the first light source module is for emitting the illumination beam, and the first beam transmission module is for transmitting the illumination beam to the first light valve, wherein the second illumination system comprises a second light source module and a second beam transmission module, the second beam transmission module is located between the second light source module and the lens, the second light source module is for emitting the ultraviolet beam, and the second beam transmission module is for transmitting the ultraviolet beam to the lens.

5. The projection device according to claim 4, further comprising a beam transmission module, wherein the beam transmission module is located on a transmission path of the illumination beam and the visible image beam and is located among the first beam transmission module, the first light valve and the lens, the illumination beam is transmitted to the first light valve through the beam transmission module, and the visible image beam is transmitted to the first lens through the beam transmission module.

6. The projection device according to claim 4, further comprising a second light valve, wherein the second light valve is located on a transmission path of the ultraviolet beam and located between the second beam transmission module and the lens, the second light valve is for causing the ultraviolet beam to comprise image information, and the lens is for projecting the ultraviolet beam comprising the image information onto the projection screen to form the black area on a part of the projection screen.

7. The projection device according to claim 6, further comprising a beam transmission module, wherein the beam transmission module is located on a transmission path of the illumination beam, the ultraviolet beam, the visible image beam and the ultraviolet beam comprising the image information and is located among the first beam transmission module, the second beam transmission module, the first light valve, the second light valve and the lens, the illumination beam is transmitted to the first light valve through the beam transmission module, the ultraviolet beam is transmitted to the second light valve through the beam transmission module, the visible image beam is transmitted to the lens through the beam transmission module, and the ultraviolet beam comprising the image information is transmitted to the lens through the beam transmission module.

8. The projection device according to claim 6, wherein the processor is further electrically connected to the second light valve, and the processor is for controlling the second light valve to cause the ultraviolet beam to comprise the image information.

9. A projection device for forming an image frame on a projection screen, the projection device comprising:
   a first projector, for emitting a visible image beam to the projection screen to form an image frame area on the projection screen;
   a second projector, for emitting an ultraviolet beam to the projection screen to form a black area on the projection screen, wherein the image frame area is partially overlapped with the black area;
   a first processor, disposed in the first projector and for controlling the first projector to emit the visible image beam; and
   a second processor, disposed in the second projector and electrically connected to the first processor, wherein the second processor is for controlling the second projector to emit the ultraviolet beam and issuing a control signal to the first processor, so that the first processor controls the first projector to emit the visible image beam.

10. The projection device according to claim 9, wherein the first projector comprises:
    a first illumination system, for emitting an illumination beam;
    a first light valve, located on a transmission path of the illumination beam and for converting the illumination beam into the visible image beam; and
    a first lens, located on a transmission path of the visible image beam and for projecting the visible image beam onto the projection screen to form the image frame area.

11. The projection device according to claim 10, wherein the first processor is electrically connected to the first illumination system and the first light valve, and the first processor is for controlling the first illumination system to emit the illumination beam and controlling the first light valve to convert the illumination beam into the visible image beam.

12. The projection device according to claim 10, wherein the first illumination system comprises:
   a first light source module, for emitting the illumination beam; and
   a first beam transmission module, located between the first light source module and the first light valve, wherein the first beam transmission module is for transmitting the illumination beam to the first light valve.

13. The projection device according to claim 12, wherein the first illumination system further comprises a beam transmission module, the beam transmission module is located on a transmission path of the illumination beam and the visible image beam and is located among the first beam transmission module, the first light valve and the first lens, the illumination beam is transmitted to the first light valve through the beam transmission module, and the visible image beam is transmitted to the first lens through the beam transmission module.

14. The projection device according to claim 9, wherein the second projector comprises:
   a second illumination system, for emitting the ultraviolet beam; and
   a second lens, located on a transmission path of the ultraviolet beam and for projecting the ultraviolet beam onto the projection screen to form the black area.

15. The projection device according to claim 14, wherein the second illumination system comprises:
   a second light source module, for emitting the ultraviolet beam; and
   a second beam transmission module, located between the second light source module and the second lens, wherein the second beam transmission module is for transmitting the ultraviolet beam to the second lens.

16. The projection device according to claim 15, wherein the second projector further comprises a second light valve, the second light valve is located on a transmission path of the ultraviolet beam and located between the second beam transmission module and the second lens, the second light valve is for causing the ultraviolet beam to comprise image information, and the second lens is for projecting the ultraviolet beam comprising the image information onto the projection screen to form the black area on a part of the projection screen.

17. The projection device according to claim 16, wherein the second processor is electrically connected to the second illumination system and the second light valve, and the second processor is for controlling the second illumination system to emit the ultraviolet beam and controlling the second light valve to cause the ultraviolet beam to comprise the image information.

18. A projection system, comprising:
   a projection screen; and
   a projection device, comprising:
      a first illumination system, for emitting an illumination beam;
      a second illumination system, for emitting an ultraviolet beam;
      a first light valve, located on a transmission path of the illumination beam and for converting the illumination beam into a visible image beam;
      a lens, located on a transmission path of the visible image beam and the ultraviolet beam, wherein the lens is for projecting the visible image beam onto the projection screen to form an image frame area and for projecting the ultraviolet beam onto the projection screen to form a black area, and the image frame area is partially overlapped with the black area; and
      a processor, electrically connected to the first illumination system and the second illumination system, wherein the processor is for controlling the first illumination system to emit the illumination beam and controlling the second illumination system to emit the ultraviolet beam.

19. The projection system according to claim 18, wherein the projection screen comprises:
   a substrate, comprising:
      a first surface, adjacent to the projection device;
      a second surface, away from the projection device and opposite to the first surface;
      a scattering reflection layer, disposed between the first surface and the second surface, wherein the scattering reflection layer is for scattering and reflecting the visible image beam; and
      an ultraviolet absorption layer, disposed between the first surface and the second surface, wherein the scattering reflection layer is located between the first surface and the ultraviolet absorption layer, and the ultraviolet absorption layer is for absorbing the ultraviolet beam so as to be changed from a transparent state to a black state;
   an anti-reflection layer, disposed on the first surface; and
   an anti-ultraviolet layer, disposed at the second surface, wherein the ultraviolet absorption layer is located between the scattering reflection layer and the anti-ultraviolet layer.

20. The projection system according to claim 19, wherein the anti-ultraviolet layer is disposed in the substrate, and the anti-ultraviolet layer is located between the second surface and the ultraviolet absorption layer.

21. The projection system according to claim 19, wherein the scattering reflection layer comprises a plurality of microstructures, each of the plurality of microstructures has an inclined surface facing the projection device, and each of the plurality of microstructures scatters and reflects the visible image beam by the inclined surface.

22. The projection system according to claim 21, wherein a light transmittance of the plurality of microstructures is 75%.

23. The projection system according to claim 21, wherein a material of the plurality of microstructures is a metal.

24. The projection system according to claim 19, wherein a material of the substrate comprises plastic and glass.

25. The projection system according to claim 18, wherein the ultraviolet beam has a wavelength range between 100 nm and 400 nm.

26. A projection system, comprising:
   a projection screen; and
   a projection device, comprising:
      a first projector, for emitting a visible image beam to the projection screen to form an image frame area on the projection screen;
      a second projector, for emitting an ultraviolet beam to the projection screen to form a black area on the projection screen, wherein the image frame area is partially overlapped with the black area;
      a first processor, disposed in the first projector and for controlling the first projector to emit the visible image beam; and
      a second processor, disposed in the second projector and electrically connected to the first processor, wherein the second processor is for controlling the second projector to emit the ultraviolet beam and issuing a control signal to the first processor, so that the first processor controls the first projector to emit the visible image beam.

\* \* \* \* \*